United States Patent
Naduthota et al.

(10) Patent No.: US 9,665,827 B2
(45) Date of Patent: May 30, 2017

(54) APPARATUS AND METHOD FOR PROVIDING A GENERALIZED CONTINUOUS PERFORMANCE INDICATOR

(71) Applicant: Honeywell International Inc., Morristown, NJ (US)

(72) Inventors: Rajeev Naduthota, Karnataka (IN); Rajni Jain, Karnataka (IN); Ranganathan Srinivasan, Karnataka (IN)

(73) Assignee: Honeywell International Inc., Morris Plains, NJ (US)

(*) Notice: Subject to any disclaimer, the term of this patent is extended or adjusted under 35 U.S.C. 154(b) by 469 days.

(21) Appl. No.: 14/265,066

(22) Filed: Apr. 29, 2014

(65) Prior Publication Data

US 2015/0309506 A1 Oct. 29, 2015

(51) Int. Cl.
*G05B 13/02* (2006.01)
*G06N 5/04* (2006.01)
*G05B 23/02* (2006.01)

(52) U.S. Cl.
CPC ......... *G06N 5/048* (2013.01); *G05B 23/0272* (2013.01)

(58) Field of Classification Search
None
See application file for complete search history.

(56) References Cited

U.S. PATENT DOCUMENTS

| 6,993,396 | B1* | 1/2006 | Gerry | G06Q 10/02 700/100 |
| 7,389,204 | B2 | 6/2008 | Eryurek et al. | |
| 7,877,232 | B2 | 1/2011 | Lee et al. | |
| 8,696,565 | B2* | 4/2014 | Alberte, Jr. | A61B 5/7445 128/920 |
| 2005/0038538 | A1* | 2/2005 | McDonald, Jr. | G05B 17/02 700/97 |

(Continued)

OTHER PUBLICATIONS

"A practical approach for large-scale controller performance assessment, diagnosis, and improvement", Journal of Process Control, 2003, retrieved from http://ac.els-cdn.com/S0959152402000185/1-s2.0-S0959152402000185-main.pdf?_tid=72f31f98-6f85-11e6-b496-00000aacb362&acdnat=1472653143_d51ad9a2388ea417ebbbb7344e8f24c9 on Aug. 31, 2016.*

(Continued)

*Primary Examiner* — Philip Wang

(57) ABSTRACT

A method includes, using at least one processing device, obtaining multiple diagnostic indicators associated with at least a portion of an industrial process system and combining the diagnostic indicators to form a generalized indicator. Each diagnostic indicator has a value, and the generalized indicator is associated with a position on a continuous scale. The continuous scale could include a color gradient, and the method could include displaying the generalized indicator along the color gradient with a color based on its position. Multiple generalized indicators associated with multiple portions of the process system could be displayed within a torus or circle, and different portions of the torus or circle can be associated with different portions of the process system. Different concentric tori or circles could be associated with different periods of time, and at least one concentric torus or circle could identify a predicted behavior of the process system.

20 Claims, 8 Drawing Sheets

(56) References Cited

U.S. PATENT DOCUMENTS

2005/0049831 A1    3/2005  Lilly
2014/0125675 A1*   5/2014  Cantwell .............. G06T 11/206
                                                          345/440.1

OTHER PUBLICATIONS

Paulonis, Michael, et al., "A practical approach for large-scale controller performance assessment, diagnosis, and improvement," Journal of Process Control 13 (2003) 155-168, 2002, 14 pages, publisher Elsevier Science Ltd., New York, NY.

Chunming, Xia, et al., "Loop status monitoring and fault localisation," Journal of Process Control 13 (2003) 679-691, 2002, 13 pages, publisher Elsevier Science Ltd., New York, NY.

Holtta, Vesa, et al., "Quality index framework for plant-wide performance evaluation," 2009, 6 pages, publisher Elsevier Science Ltd., New York, NY.

Microsoft Corporation, "Walkthrough: Calculate normalized scores for KPIs," Feb. 12, 2013, 6 pages, available at: https://support.office.com/en-us/article/Walkthrough-Calculate-normalized-scores-for-KPIs-245a8fc5-42a4-432c-bd83-b242f2039c56?CorrelationId=200a9d27-fcba-43f2-8838-fde2e5554aef&ui=en-US&rs=en-US&ad=US&ocmsasset1D=HA010254033.

cbsolution.net, "How to consolidate multiple KPIs," Sep. 1, 2011, 2 pages, available at cbsolution.net/techniques/ontarget/how_to_consolidate_multiple_kpis.

* cited by examiner

| CONTROLLER CATEGORY | 0.4 <= RPI <= 2.5 | OSI < 0.4 | Err.StDev < 0.02*PVMean |
|---|---|---|---|
| EXCELLENT | TRUE | TRUE | TRUE |
| GOOD | FALSE | TRUE | TRUE |
| GOOD | TRUE | TRUE | FALSE |
| FAIR | TRUE | FALSE | TRUE |
| FAIR | FALSE | FALSE | TRUE |
| FAIR | TRUE | FALSE | FALSE |
| POOR | FALSE | TRUE | FALSE |
| POOR | FALSE | FALSE | FALSE |

530

| RPI (535) | OSI (540) | Std-Dev (545) | GENERALIZED CPI (550) |
|---|---|---|---|
| GOOD | GOOD | GOOD | EXCELLENT |
| NOT GOOD | GOOD | GOOD | GOOD |
| GOOD | GOOD | NOT GOOD | GOOD |
| GOOD | NOT GOOD | GOOD | FAIR |
| NOT GOOD | NOT GOOD | GOOD | FAIR |
| GOOD | NOT GOOD | NOT GOOD | FAIR |
| NOT GOOD | GOOD | NOT GOOD | POOR |
| NOT GOOD | NOT GOOD | NOT GOOD | POOR |

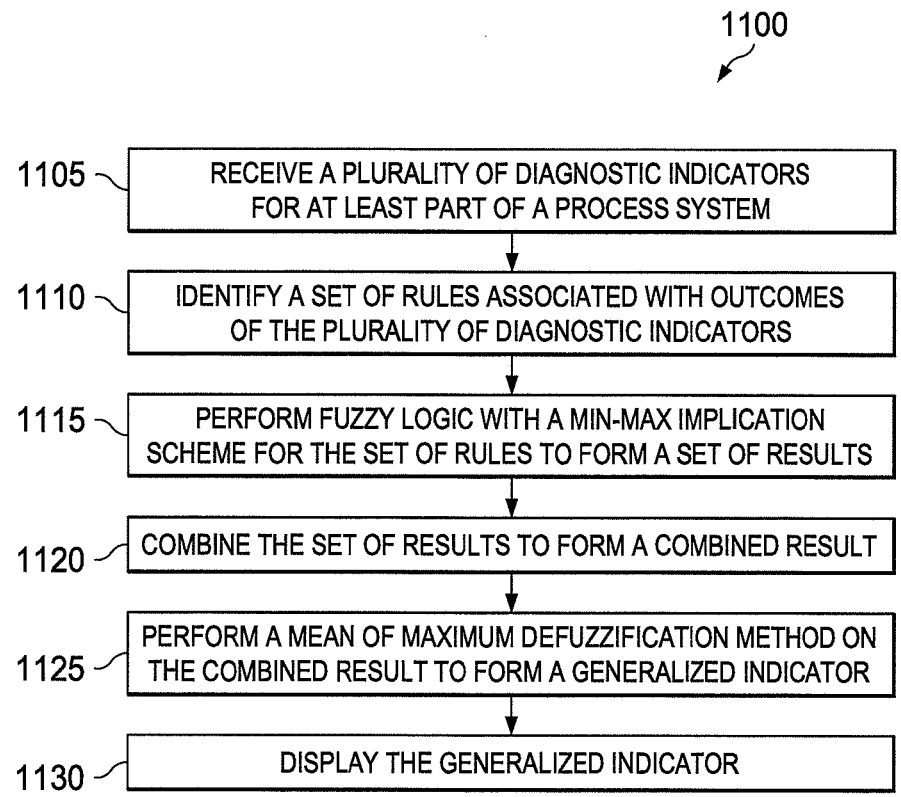

1100

1105 — RECEIVE A PLURALITY OF DIAGNOSTIC INDICATORS FOR AT LEAST PART OF A PROCESS SYSTEM

1110 — IDENTIFY A SET OF RULES ASSOCIATED WITH OUTCOMES OF THE PLURALITY OF DIAGNOSTIC INDICATORS

1115 — PERFORM FUZZY LOGIC WITH A MIN-MAX IMPLICATION SCHEME FOR THE SET OF RULES TO FORM A SET OF RESULTS

1120 — COMBINE THE SET OF RESULTS TO FORM A COMBINED RESULT

1125 — PERFORM A MEAN OF MAXIMUM DEFUZZIFICATION METHOD ON THE COMBINED RESULT TO FORM A GENERALIZED INDICATOR

1130 — DISPLAY THE GENERALIZED INDICATOR

FIG. 11

APPARATUS AND METHOD FOR PROVIDING A GENERALIZED CONTINUOUS PERFORMANCE INDICATOR

TECHNICAL FIELD

This disclosure relates generally to industrial control and automation systems. More specifically, this disclosure relates to an apparatus and method for providing a generalized continuous performance indicator.

BACKGROUND

Industrial process controllers have many different configurations and are used in many different applications. Controllers may be mounted in a control room or may be part of a distributed control system. Controllers are often designed to maintain process variables at desired reference points known as setpoints. A system designed to control a process variable may be called a control loop.

Control loops can experience problems that result in poor control of process variables. A problem can occur with a final control element, a sensor, tuning parameters of a controller, or something else. If the control loop is isolated or is only one of a handful of control loops, an experienced control engineer can usually determine what the problem is within a reasonable period of time. In a large industrial facility, however, it is not uncommon to have hundreds or thousands of control loops with their associated controllers. In such an industrial facility, it is often difficult to determine which control loops are experiencing problems, especially when a problem in one control loop adversely affects other control loops.

In a typical scenario, the performance of each control loop can be rated against multiple Key Performance Indicators (KPIs). However, there are often numerous indicators to be monitored for all control loops in an industrial facility.

SUMMARY

This disclosure provides an apparatus and method for providing a generalized continuous performance indicator.

In a first embodiment, a method includes, using at least one processing device, obtaining multiple diagnostic indicators associated with at least a portion of an industrial process system and combining the diagnostic indicators to form a generalized indicator. Each diagnostic indicator has a value, and the generalized indicator is associated with a position on a continuous scale.

In a second embodiment, an apparatus includes at least one memory configured to store information identifying multiple diagnostic indicators associated with at least a portion of an industrial process system. The apparatus also includes at least one processing device configured to combine the diagnostic indicators to form a generalized indicator. Each diagnostic indicator has a value, and the generalized indicator is associated with a position on a continuous scale.

In a third embodiment, a non-transitory computer readable medium embodies a computer program. The computer program includes computer readable program code for obtaining multiple diagnostic indicators associated with at least a portion of an industrial process system. The computer program also includes computer readable program code for combining the diagnostic indicators to form a generalized indicator. Each diagnostic indicator has a value, and the generalized indicator is associated with a position on a continuous scale.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5A through 5C illustrates an example continuous performance index (CPI) system according to this disclosure;

FIG. 11 illustrates an example method for analyzing at least part of a process system according to this disclosure.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
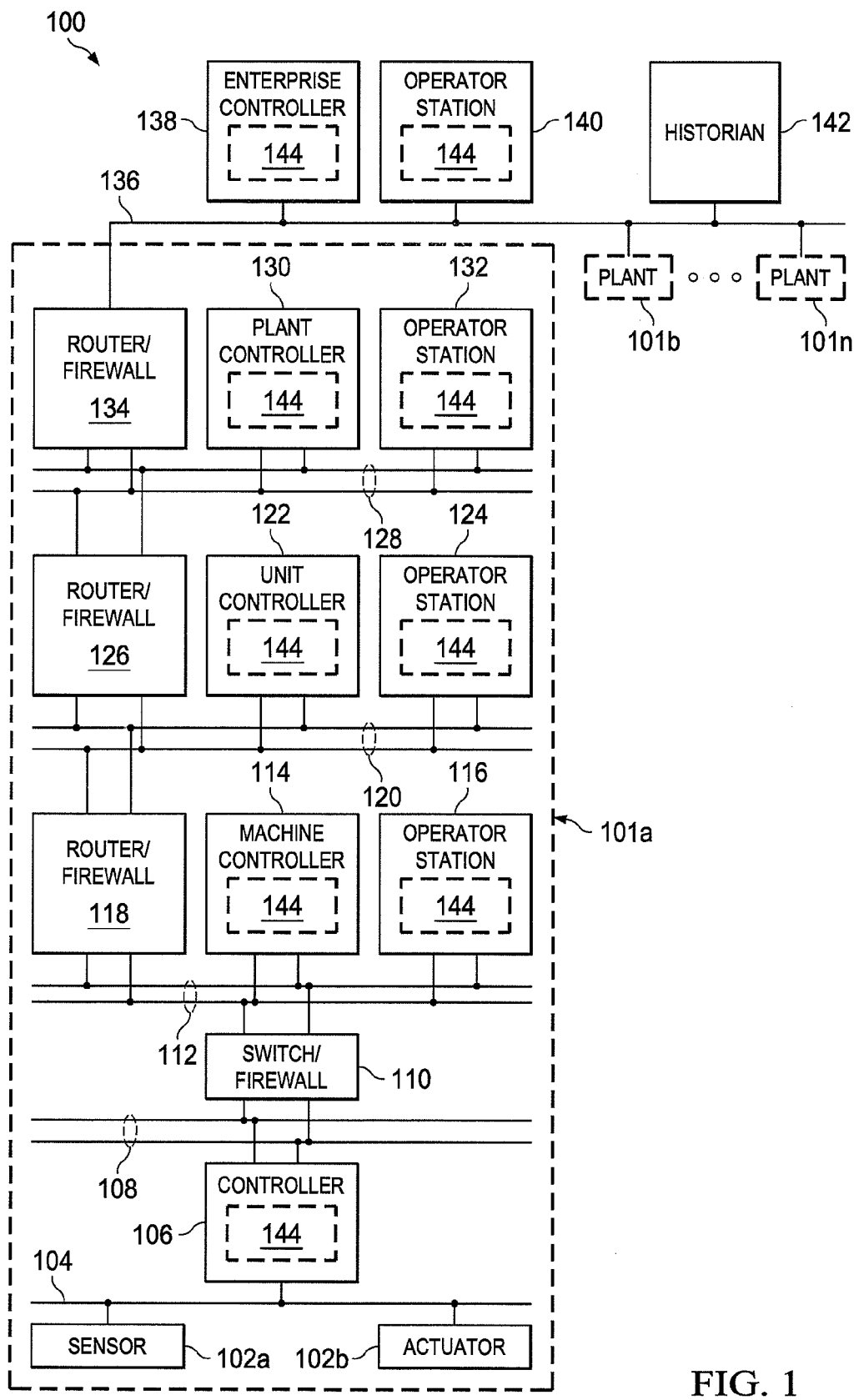
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, level or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent simple Proportional Integral Derivative (PID) controllers that are part of a distributed control system, a multivariable controller, or advanced controllers such as model predictive controllers. As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices; one or more memories for storing instructions and data used, generated, or collected by the processing device(s); and one or more interfaces for communicating with external devices or systems (such as one or more Ethernet interfaces).

As described above, conventional industrial facilities can include hundreds or thousands of control loops with their associated controllers. As a result, it is often difficult to determine which control loops are experiencing problems, especially when a problem in one control loop adversely affects other control loops. A generalized index can be used in control loop monitoring tools to provide a qualitative indication of an overall loop performance (such as Excellent, Fair, Poor, etc.) based on the values of various Key Performance Indicators (KPIs) (which may also be known as diagnostic indicators). Since this indication is qualitative, the nature of information given to an operator is only in certain discrete levels. Also, because of its qualitative nature, this generalized index cannot be rolled up to upper levels in a hierarchy, unlike the individual KPIs. A quantitative measure of overall loop performance is thus needed to address various issues.

In accordance with this disclosure, at least one component of the system 100 implements or otherwise provides a generalized indicator tool 144. The generalized indicator tool 144 helps to provide a better indication of the status of equipment in a control loop.

In some embodiments, the generalized indicator tool 144 may provide a better visualization of the overall loop performance status to a user, simplifying control loop monitoring. For example, the generalized indicator tool 144 may provide a quantitative measure associated with the overall performance of a control loop so as to provide a continuous status about the loop's performance (referred to as a continuous performance index or CPI). The scale can be normalized, such as from "0" to "1" (with "1" indicating excellent behavior of the loop and "0" indicating poor behavior of the loop). Further, color gradient information can be added to the quantitative measure, such as green for excellent to red for poor, in order to provide a better visual depiction to the operator. The generalized indicator tool 144 may provide a color gradient-based progressive indication of the overall loop performance so that the operator gets an idea about the ongoing performance of the loop over a period of time. This can also help in analyzing the impact of actions/changes done over a period of time. In particular embodiments, a color gradient-based progressive indication can be provided for each KPI in the loop so that the operator can monitor the behavior of each KPI over a period of time and take specific actions based on a KPI that is going bad.

The generalized indicator tool 144 can support various other features. For example, the generalized indicator tool 144 may provide a mechanism to give early warning to concerned authorities about an impending deterioration based upon a rate of ongoing performance degradation, thereby enabling corrective action to be taken. As another example, the generalized indicator tool 144 may provide a mechanism to display predictive performance of the loop in the near future, thereby enabling the operator to take pre-emptive measures to avert further degradation. As a third example, the generalized indicator tool 144 may provide a generalized CPI at all levels in a plant hierarchy (such as from unit level to enterprise level) in order to provide a better indication of overall performance to concerned authorities.

For advance process control applications, where process model can contribute significantly towards the performance of any loop, the generalized indicator tool 144 can give an overall quality of the model. Embodiments of this disclosure for example can be used to combine existing model quality metrics (such as a model quality index/phase index) to derive a generalized model quality index. In addition, a progressive indication of the generalized model index can be helpful to a user in order to monitor the quality of a model over a period of time and enable pre-emptive action in case the model quality is degrading.

For alarm management applications, where the objective is to manage the alarms generated within in plant, the generalized indicator tool can provide a continuous status of overall alarm performance. A color gradient-based progressive indication of plant's overall alarm performance enables pre-emptive actions in case of gradual degradation.

The generalized indicator tool 144 can be implemented using any suitable hardware or combination of hardware and software/firmware. For example, the generalized indicator tool 144 could be implemented using a software application that is executed by the processing device(s) of a controller or operator station.

Although FIG. 1 illustrates one example of an industrial process control and automation system 100, various changes may be made to FIG. 1. For example, a control system could include any number of sensors, actuators, controllers, servers, operator stations, networks, and generalized indicator tools. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which a generalized indicator tool can be used. This functionality can be used in any other suitable device or system.

Figures 2, 3:
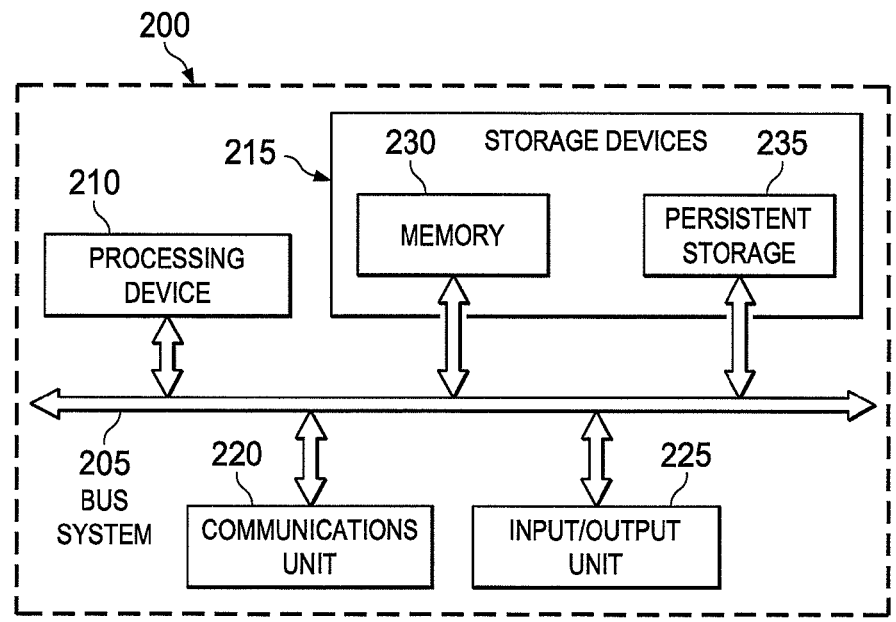
FIG. 2 illustrates an example device for implementing a generalized indicator tool in an industrial control and automation system according to this disclosure.
FIG. 3 illustrates an example indicator table according to this disclosure.

FIG. 2 illustrates an example device 200 for implementing a generalized indicator tool in an industrial control and automation system according to this disclosure. In particular, FIG. 2 illustrates an example computing device 200. The computing device 200 could, for example, represent a controller or operator station in FIG. 1.

As shown in FIG. 2, the computing device 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over a network. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the device 200 can be used to execute the generalized indicator tool 144 in order to provide overall performance indicators as continuous quantitative values. For better visual interpretations, the continuous values can be associated with different colors. This can be done, for example, by associating various combinations of standard RGB colors to define a color gradient (Green to Red) for a generalized CPI as its value changes from "1" to "0". The overall loop performance obtained represents a quantitative measure that can be easily rolled up to all higher levels in a control hierarchy.

Although FIG. 2 illustrates one example of a device 200 for implementing a generalized indicator tool 144 in an industrial control and automation system, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

FIG. 3 illustrates an example indicator table 300 according to this disclosure. As shown in FIG. 3, the indicator table 300 may include a controller category 305, a Relative Performance Index (RPI) range 310, an Oscillation Index (OSI) range 315, and an Error Standard Deviation (std-dev) range 320. The Oscillation Index element produces a measure of an oscillation in input tag data. The Oscillation Index element may be a value between zero and one, where values approaching zero represent less oscillation and values approaching one represent more oscillations and more oscillations that are regular. The Relative Performance Index is a ratio between a benchmark response speed and an actual response speed. The Error Standard Deviation is a measure of a variability in a controller, which can provide an indication of how aggressive the controller is. In some embodiments, the Error Standard Deviation of the controller's error signal over a 24-hour period can be used with a very high value indicating high controller action. The OSI, RPI, and Error Standard Deviation may be key performance indicators (KPIs).

In some embodiments, the indicator table 300 may combine these KPIs into qualitative indicators, such as excellent, good, fair, poor, and the like. Each KPI can be associated with a band that defines its acceptable range of operation. For example, acceptable ranges of the KPIs could be an OSI between 0.0-0.5, an RPI between 0.4-2.5, and a std-dev between 0-2% of PV mean value In other embodiments, these ranges may be different.

At any point in time, the overall performance rating for a control loop can be determined based on which of these indicators are within their acceptable operating ranges. In the indicator table 300, the overall performance rating for the loop under observation remains excellent as long as all three KPIs are within their acceptable ranges. In this approach, the table 300 does not differentiate, for example, scenarios where the OSI is 0.12 or 0.38.

Although FIG. 3 illustrates one example of an indicator table 300, various changes may be made to FIG. 3. For example, the ranges in FIG. 3 are examples only.

Figure 4:
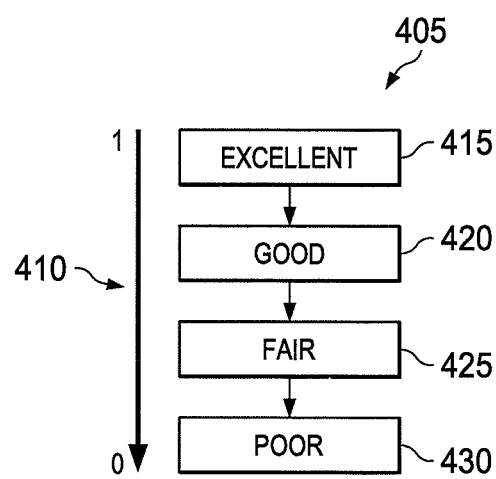
FIG. 4 illustrates an example discrete band and an example continuous scale according to this disclosure.

FIG. 4 illustrates an example discrete band 405 and an example continuous scale 410 according to this disclosure. As shown in FIG. 4, the discrete band 405 may include discrete indicators 415-430 identifying excellent, good, fair, and poor conditions. The discrete band 405 may therefore simply be a list of discrete indicators, such as that shown in the indicator table 300 of FIG. 3. For example, a performance indicator may be fair due to the characteristics of different KPIs.

In contrast, the continuous scale 410 may include values from "1" to "0" (when the scale is normalized). In other embodiments, the continuous scale 410 may not be normalized, and the continuous scale 410 could span other ranges of values. The "1" value in the continuous scale 410 of FIG. 4 may represent an excellent condition from the discrete band 405. Likewise, the "0" value in the continuous scale 410 of FIG. 4 may represent a poor condition from the discrete band 405. The remaining portions of the continuous scale 410 may be varying grades between excellent and poor. As can be seen, the continuous scale 410 provides a gradual change in performance indicators, while the discrete band 405 provides a sharper change.

Although FIG. 4 illustrates one example of a discrete band 405 and one example of a continuous scale 410, various changes may be made to FIG. 4. For example, the continuous scale 410 can span any range of values that can encompass any number of discrete conditions.

Figure 5A:
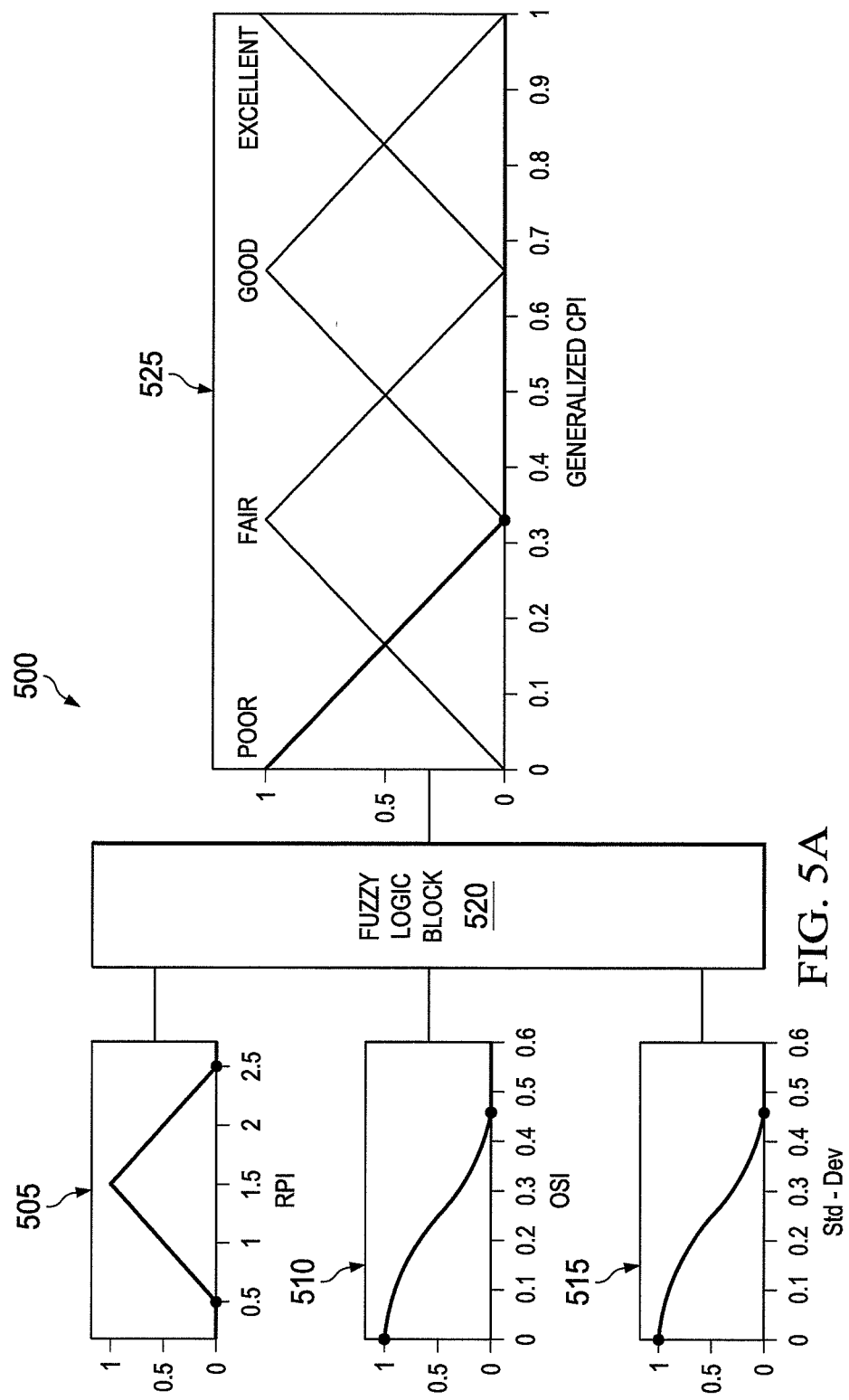
Figure 5C:
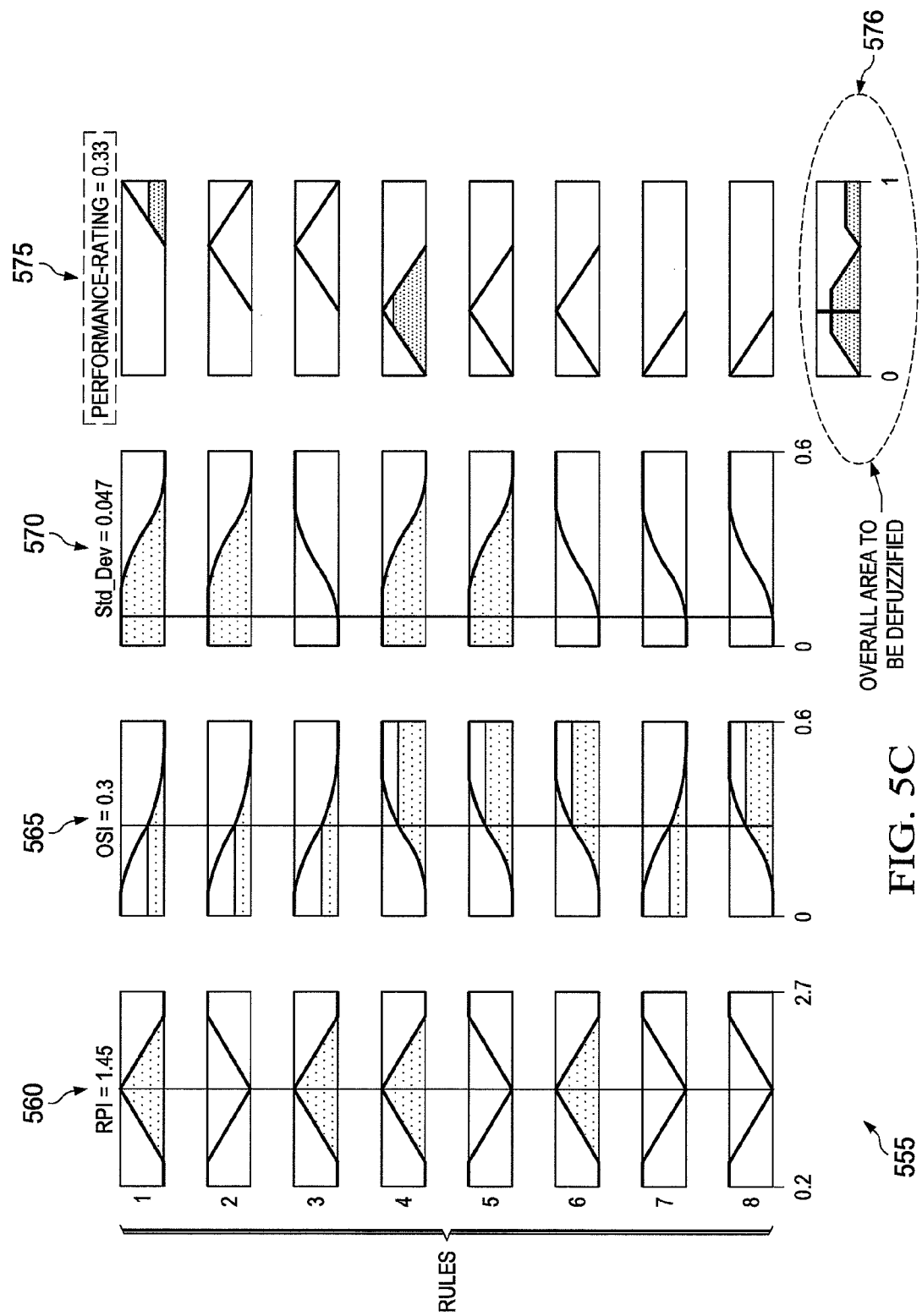

FIGS. 5A through 5C illustrates an example continuous performance index (CPI) system 500 according to this disclosure. As shown in FIG. 5A, the CPI system 500 includes inputs 505-515, a fuzzy logic block 520, and an output 525.

The inputs 505-515 may be KPIs, such as RPI, OSI, and error standard deviation values. The inputs 505-515 are processed by the fuzzy logic block 520. Each input can be processed according to its predefined acceptable range. For example, as shown above, the OSI can be acceptable between 0 and 0.5. The fuzzy logic block 520 operates to generate a generalized CPI value as the output 525. The generalized CPI can be defined based upon the existing discrete levels of the overall performance rating. The types of input and output functions (such as triangular, Gaussian, and the like) can be selected to suit the properties of the corresponding index. Any number of KPIs can be associated with a single generalized CPI.

In some embodiments, the fuzzy logic block 520 can use a Fuzzy Associative Memory (FAM) table 530, which is shown in FIG. 5B. The FAM table 530 defines the rules governing the overall implementation logic, such as "if-then" rules. For example, if the RPI 535 is good, the OSI 540 is good, and the std-dev 545 is good, the generalized CPI 550 is Excellent. In some embodiments, the importance of various input indices towards the overall performance rating can be considered while defining the fuzzy rules. For example, rules 536 indicate that the OSI 540 index is more critical when defining the overall performance of the control loop compared to the other two indices. In other examples, other KPIs may be more important.

In some embodiments, the fuzzy logic block 520 uses Mamdani-based fuzzy logic based on a min-max implication scheme to combine inputs 560-570 for each rule 1-8 as shown in FIG. 5C. Once the inputs 560-570 are combined for each rule 1-8, each of the results 575 may be combined, and the fuzzy logic block 520 can use a defuzzification method of Mean of Maximum (MOM) to derive a generalized CPI 576.

At any point in time, based upon the current values of individual KPIs, the respective rules as defined in the FAM table 530 can be fired. The level of activation of each input function, together with the min-max implication scheme, may define the corresponding regions to be defuzzified. Finally, based upon the defuzzification method used, the defuzzified value of the generalized CPI can be obtained.

Although FIGS. 5A through 5C illustrates one example of a CPI system 500, various changes may be made to FIGS. 5A through 5C. For example, other approaches could be used to define a generalized CPI value.

Figure 6:
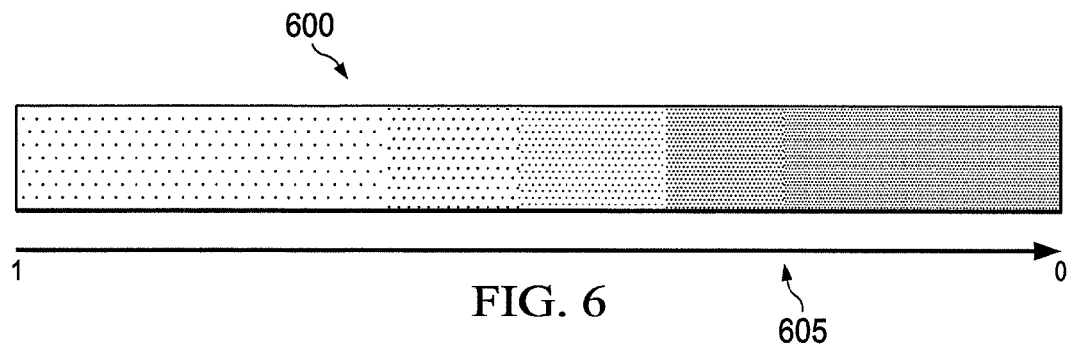
FIG. 6 illustrates an example continuous color scale according to this disclosure.

FIG. 6 illustrates an example continuous color scale 600 according to this disclosure. As shown in FIG. 6, the continuous color scale 600 may be normalized and include values from "1" to "0". The continuous color scale 600 may change color along a scale 605. The scale 605 may be a normalized scale from "1" to "0", such as when "1" is represented by green, "0" is represented by red, and the middle of the scale is represented by yellow with a gradient of color change along the scale.

Although FIG. 6 illustrates one example of a continuous color scale 600, various changes may be made to FIG. 6. For example, any suitable colors and gradients could be used.

Figure 7:
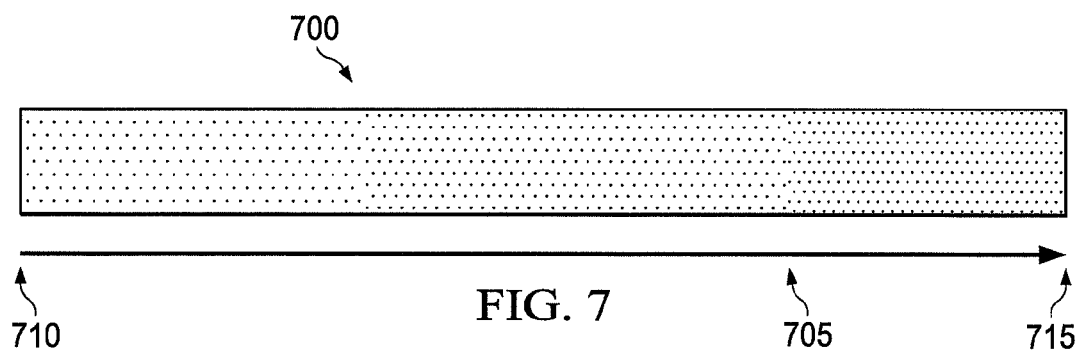
FIG. 7 illustrates an example progression according to this disclosure.

FIG. 7 illustrates an example progression 700 according to this disclosure. As shown in FIG. 7, the progression 700 may be an expression of the generalized CPI over the course of a period of time. The progression 700 may change color along a timeline 705 corresponding to the value of the generalized CPI at each point in time along the timeline 705. For example, in some embodiments, the timeline 705 may start with a first date 710 and end with a second date 715. The time between the first date 710 and the second date 715 may be, for example, three days. In particular embodiments, the first day may begin with an excellent generalized CPI represented by green, then move to fair on the second day represented by yellow, and then back to excellent on the third day represented by green.

Although FIG. 7 illustrates one example of a progression 700, various changes may be made to FIG. 7. For example, the progression 700 could span any length of time and include any number of changes.

Figure 8:
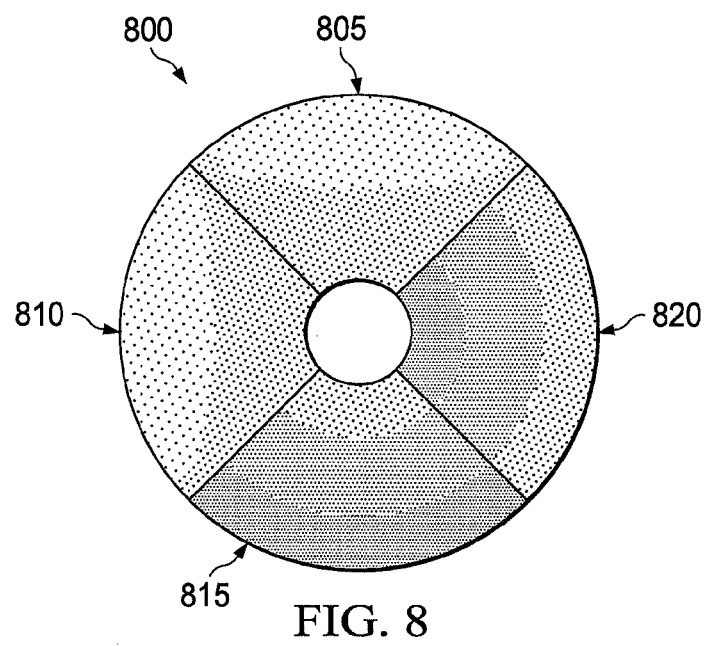
FIGS. 8 and 9 illustrate example plant progressions according to this disclosure.
Figure 9:
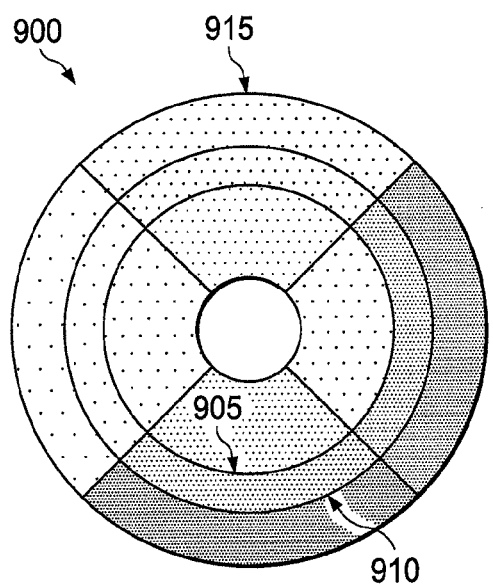

FIGS. 8 and 9 illustrate example plant progressions according to this disclosure. As shown in FIG. 8, a plant progression 800 may be an expression of the generalized CPI of all of the areas of a plant over the course of a period of time.

In this example, the plant progression 800 is represented by a torus. Note, however, that the plant progression 800 may be represented by other shapes, such as a circle, oval, square, or octagon. The torus is split into four sections 805-820, each of which may represent an area of the plant. Each area may itself represent one or multiple units, and each section 805-820 may show a progression for the area represented.

In FIG. 8, the timeline may begin in the center of the torus and move outward over time. Note, however, that time could progress in other ways, such as outward in. The plant progression 800 may change color along the timeline corresponding to the value of the generalized CPI at each point in time along the timeline. For example, the section 805 may represent an area that started with an excellent generalized CPI (as represented in green towards the inside of the torus) but then became fair (as represented in yellow towards the perimeter of the torus). In other embodiments, each section 805-820 is represented by a single color and represents a single point in time. Note that the plant progression 800 may be at a machine level, unit level, plant level, enterprise level, and the like.

As shown in FIG. 9, a plant progression 900 may be an expression of the generalized CPI of all areas of a plant over the course of a period of time. The period of time may include past, present, and future events.

In this example, the plant progression 900 is represented by a torus, although other shapes could be used. The torus is sectioned into four sections similar to the plant progression 800 as shown in FIG. 8. Each section may represent a different area of the plant, and each area may represent a plurality of units. Each section may be further separated into concentric tori 905-915, which represent different periods of time. For example, the torus 905 may represent a previous day, the torus 910 may represent the present day, and the torus 915 may represent the next day as a predictor.

In some embodiments, the timeline may begin in the center of the torus and move outward over time, although time could progress in other ways. The plant progression 900 may change color along the timeline corresponding to the value of the generalized CPI at each point in time along the timeline. Note that the plant progression 900 may be at a machine level, unit level, plant level, enterprise level, and the like.

In some embodiments, the progressions 800 and 900 can be used to help analyze the status of a plant or portion thereof over a period of time, issue initial warnings, and enable pre-emptive actions in situations of gradual degradation.

Although FIGS. 8 and 9 illustrate examples of plant progressions 800 and 900, various changes may be made to FIGS. 8 and 9. For example, the progressions 800 and 900 could span any length of time, include any number of changes, and have any number of sections and tori.

Figure 10A:
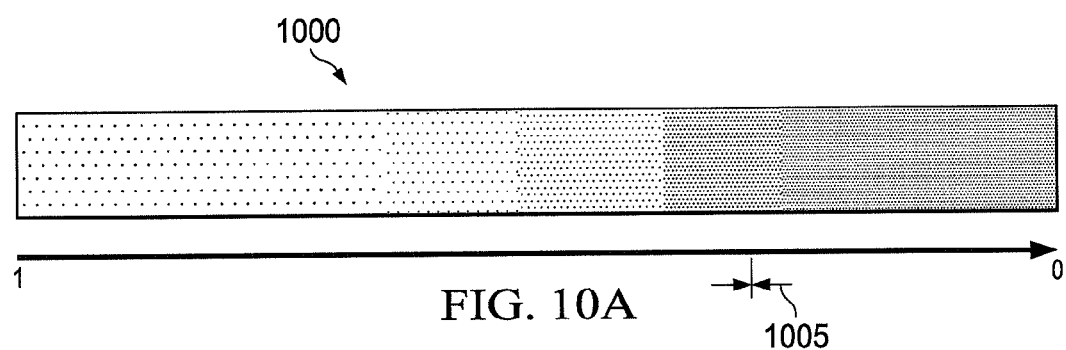
FIGS. 10A and 10B illustrate example instances for triggering an alarm according to this disclosure.
Figure 10B:
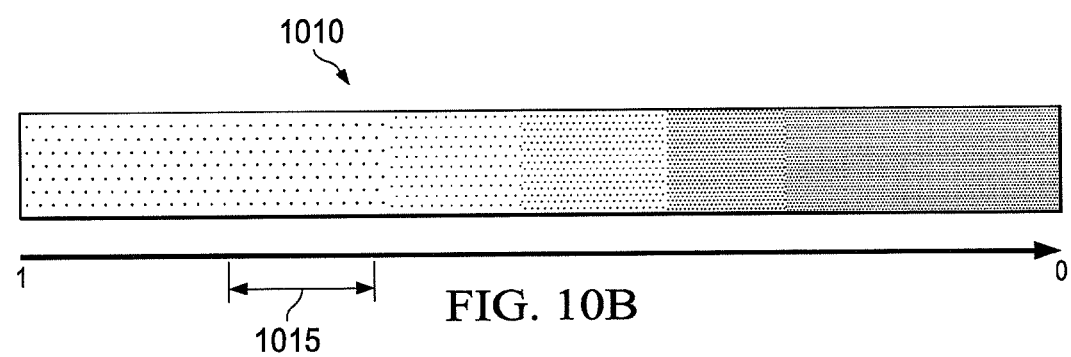

FIGS. 10A and 10B illustrate example instances for triggering an alarm according to this disclosure. As shown in FIGS. 10A and 10B, a continuous color scale 1000 and a continuous color scale 1010 may be normalized and include values from "1" to "0". In FIG. 10A, at a mark 1005, the degradation of a system may reach a point at which an operator is notified, such as by alarm or warning. Note that the mark 1005 can be set to any suitable point or points.

In FIG. 10B, in the continuous color scale 1010, a system may degrade quickly enough to notify an operator, such as by an alarm or warning. For example, a distance 1015 may represent the degradation of the system over a period of a single day, and this distance can be compared to a threshold to identify a problem. If, for example, the degradation at the distance 1015 is a percentage of 22%, the system may alert an operator if the threshold is 20%. Note, however, that other distances, thresholds, and periods of time may be used.

Although FIGS. 10A and 10B illustrate examples of instances for triggering an alarm, various changes may be made to FIGS. 10A and 10B. For example, one or both of these approaches could be used.

FIG. 11 illustrates an example method 1100 for analyzing at least part of a process system according to this disclosure. For ease of explanation, the method 1100 is described as being performed by the device 200 of FIG. 2 operating in the system 100 of FIG. 1. However, the method 1100 could be used by any suitable device and in any suitable system.

As shown in FIG. 11, at operation 1105, the device receives a plurality of diagnostic indicators for at least part of a process system. Each diagnostic indicator has a value, and that value may represent the value of a key performance indicator. At operation 1110, the device identifies a set of rules for each outcome of the plurality of diagnostic indicators. In some embodiments, the rules may be the same as or similar to rules 1-8 of FIG. 5C.

At operation 1115, the device performs fuzzy logic with a min-max implication scheme for each rule of the set of rules to form a set of results. At operation 1120, the device combines the set of results to form a combined result. At operation 1125, the device performs a mean of maximum defuzzification method on the combined result to form a generalized indicator. At operation 1130, the device displays the generalized indicator, which represents a value on a continuous scale. The continuous scale can include a color gradient, and the specific generalized indicator may appear as a color based on the position of the generalized indicator along the color gradient.

Although FIG. 11 illustrates one example of a method 1100 for analyzing at least part of a process system, various changes may be made to FIG. 11. For example, while shown as a series of steps, various steps in FIG. 11 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or Other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
using at least one processing device:
obtaining multiple diagnostic indicators associated with a portion of an industrial process system;
combining the diagnostic indicators to form a generalized indicator; and
displaying multiple generalized indicators associated with multiple portions of the industrial process system within a specified shape;
wherein each diagnostic indicator has a value;
wherein the generalized indicator is associated with a position on a continuous scale; and
wherein different portions of the specified shape are associated with different portions of the industrial process system.

2. The method of claim 1, wherein:
the continuous scale comprises a color gradient; and
the generalized indicator is displayed along the color gradient with a color based on its position.

3. The method of claim 1, further comprising:
normalizing the continuous scale and the generalized indicator.

4. The method of claim 1, wherein the multiple generalized indicators for the multiple portions of the industrial process system are averaged to form an overall generalized indicator for the industrial process system.

5. The method of claim 1, wherein the specified shape comprises a torus or circle.

6. The method of claim 5, wherein:
the torus or circle comprises multiple concentric tori or circles;
each concentric torus or circle is associated with a period of time; and
at least one of the concentric tori or circles identifies a predicted behavior of the industrial process system.

7. A method comprising:
using at least one processing device:
obtaining multiple diagnostic indicators associated with at least a portion of an industrial process system; and
combining the diagnostic indicators to form a generalized indicator;
wherein each diagnostic indicator has a value;
wherein the generalized indicator is associated with a position on a continuous scale; and
wherein combining the diagnostic indicators comprises:
identifying a set of rules associated with outcomes of the diagnostic indicators;
performing fuzzy logic with a min-max implication scheme for the set of rules to form a set of results;
combining the set of results to form a combined result; and
performing a mean of maximum defuzzification method on the combined result to identify the generalized indicator.

8. An apparatus comprising:
at least one memory configured to store information identifying multiple diagnostic indicators associated with a portion of an industrial process system; and
at least one processing device configured to combine the diagnostic indicators to form a generalized indicator and to display multiple generalized indicators associated with multiple portions of the industrial process system within a specified shape;
wherein each diagnostic indicator has a value;
wherein the generalized indicator is associated with a position on a continuous scale; and
wherein different portions of the specified shape are associated with different portions of the industrial process system.

9. The apparatus of claim 8, wherein:
the continuous scale comprises a color gradient; and
the at least one processing device is configured to display the generalized indicator along the color gradient with a color based on its position.

10. The apparatus of claim 8, wherein the at least one processing device is further configured to normalize the continuous scale and the generalized indicator.

11. The apparatus of claim 8, wherein the at least one processing device is further configured to average the multiple generalized indicators for the multiple portions of the industrial process system to form an overall generalized indicator for the industrial process system.

12. The apparatus of claim 8, wherein the specified shape comprises a torus or circle.

13. The apparatus of claim 12, wherein:
the torus or circle comprises multiple concentric tori or circles;
each concentric torus or circle is associated with a period of time; and
at least one of the concentric tori or circles identifies a predicted behavior of the industrial process system.

14. An apparatus comprising:
at least one memory configured to store information identifying multiple diagnostic indicators associated with at least a portion of an industrial process system; and
at least one processing device configured to combine the diagnostic indicators to form a generalized indicator;
wherein each diagnostic indicator has a value;

wherein the generalized indicator is associated with a position on a continuous scale; and wherein the at least one processing device is configured to combine the diagnostic indicators by:

identifying a set of rules associated with outcomes of the diagnostic indicators;

performing fuzzy logic with a min-max implication scheme for the set of rules to form a set of results;

combining the set of results to form a combined result; and performing a mean of maximum defuzzification method on the combined result to identify the generalized indicator.

15. A non-transitory computer readable medium containing a computer program, the computer program comprising computer readable program code that when executed causes at least one processing device to:

obtain multiple diagnostic indicators associated with a portion of an industrial process system;

combine the diagnostic indicators to form a generalized indicator; and display multiple generalized indicators associated with multiple portions of the industrial process system within a specified shape;

wherein each diagnostic indicator has a value;

wherein the generalized indicator is associated with a position on a continuous scale; and wherein different portions of the specified shape are associated with different portions of the industrial process system.

16. The non-transitory computer readable medium of claim 15, wherein:

the continuous scale comprises a color gradient; and the computer program comprises computer readable program code that when executed causes the at least one processing device to display the generalized indicator along the color gradient with a color based on its position.

17. The non-transitory computer readable medium of claim 15, wherein the computer program further comprises computer readable program code that when executed causes the at least one processing device to normalize the continuous scale and the generalized indicator.

18. The non-transitory computer readable medium of claim 15, wherein the specified shape comprises a torus or circle.

19. The non-transitory computer readable medium of claim 18, wherein:

the torus or circle comprises multiple concentric tori or circles;

each concentric torus or circle is associated with a period of time; and at least one of the concentric tori or circles identifies a predicted behavior of the industrial process system.

20. A non-transitory computer readable medium containing a computer program, the computer program comprising computer readable program code that when executed causes at least one processing device to:

obtain multiple diagnostic indicators associated with at least a portion of an industrial process system; and combine the diagnostic indicators to form a generalized indicator;

wherein each diagnostic indicator has a value;

wherein the generalized indicator is associated with a position on a continuous scale; and wherein the computer readable program code that when executed causes the at least one processing device to combine the diagnostic indicators comprises computer readable program code that when executed causes the at least one processing device to:

identify a set of rules associated with outcomes of the diagnostic indicators;

perform fuzzy logic with a min-max implication scheme for the set of rules to form a set of results;

combine the set of results to form a combined result; and perform a mean of maximum defuzzification method on the combined result to identify the generalized indicator.

* * * * *